(12) United States Patent
Eisen et al.

(10) Patent No.: US 7,120,590 B1
(45) Date of Patent: Oct. 10, 2006

(54) ELECTRONICALLY DISTRIBUTING PROMOTIONAL AND ADVERTISING MATERIAL BASED UPON CONSUMER INTERNET USAGE

(75) Inventors: Bruce Eisen, Los Angeles, CA (US); Roger Padayao, Van Nuys, CA (US); Wasef Kassis, Canyon Country, CA (US); James E. Lucas, IV, Moorpark, CA (US)

(73) Assignee: User Trencis, Inc., Los Angeles, CA (US)

( * ) Notice: Subject to any disclaimer, the term of this patent is extended or adjusted under 35 U.S.C. 154(b) by 707 days.

(21) Appl. No.: 09/379,167

(22) Filed: Aug. 23, 1999

(51) Int. Cl.
G06Q 30/00 (2006.01)
(52) U.S. Cl. .................................................. 705/14
(58) Field of Classification Search ............... 705/26, 705/14
See application file for complete search history.

(56) References Cited

U.S. PATENT DOCUMENTS

| | | | |
|---|---|---|---|
| 5,710,884 A | 1/1998 | Dedrick | 395/200.47 |
| 5,724,521 A | 3/1998 | Dedrick | 395/226 |
| 5,793,972 A | 8/1998 | Shane | |
| 5,796,952 A | 8/1998 | Davis et al. | 395/200.54 |
| 5,864,871 A * | 1/1999 | Kitain et al. | 707/104.1 |
| 5,875,296 A | 2/1999 | Shi et al. | 395/188.01 |
| 5,889,863 A | 3/1999 | Weber | 380/25 |
| 5,933,811 A | 8/1999 | Angles et al. | 705/14 |
| 5,948,061 A | 9/1999 | Merriman et al. | 709/219 |
| 6,006,197 A | 12/1999 | d'Eon et al. | 705/10 |
| 6,009,410 A | 12/1999 | LeMole et al. | 705/14 |
| 6,026,369 A | 2/2000 | Capek | 705/14 |
| 6,055,510 A | 4/2000 | Henrick | |
| 6,055,573 A * | 4/2000 | Gardenswartz et al. | 709/224 |
| 6,065,048 A * | 5/2000 | Higley | 709/218 |
| 6,272,214 B1 | 8/2001 | Jonsson | |
| 6,289,318 B1 * | 9/2001 | Barber | 705/14 |
| 6,292,786 B1 * | 9/2001 | Deaton et al. | 705/14 |
| 6,449,634 B1 * | 9/2002 | Capiel | 709/206 |

OTHER PUBLICATIONS

Gaw, Jonathan, "Telling on Yourself," *Los Angeles Times, Orange Country Edition*, Jun. 21, 1999, Business Section, Part C, p. 7, Financial Desk.
PCT International Search Report, International Application No.: PCT/US00/23101; Applicant's file reference M-7729 WO, Nov. 14, 2000.
PCT International Written Opinion, International Application No. PCT/US00/23101, mailed May 29, 2001; Applicant's file reference: M-7729 WO.

* cited by examiner

*Primary Examiner*—Donald L. Champagne
(74) *Attorney, Agent, or Firm*—Century IP Group; F. Jason Far-hadian, Esq.

(57) ABSTRACT

Process steps are provided for electronically sending promotional and advertising materials based upon consumer preferences by providing a unique identifier to a consumer's electronic mail address and sending electronic mail to the consumer, wherein the electronic mail includes a plurality of embedded Internet web sites. Thereafter, the consumer accesses the plurality of embedded Internet web sites in response to the sent electronic mail, and consumer movement within the plurality of accessed embedded Internet web sites is tracked. Promotional material can then be sent to the consumer based upon the tracked consumer movement within the embedded Internet web sites. Process steps are also provided to track consumer movement without the consumer's electronic mail address, if the consumer makes a purchase with a credit card while at a seller's web site. The IP address is linked to the credit card to track consumer movement within the web site.

60 Claims, 10 Drawing Sheets

To:     CONSUMERM@dgo.com  — 604
From:   RETAIL STORE  —— 605
Re:     Promotional material http://www.mystore.com/?XXXX  — 606

To: CONSUMERM@dgo.com — 604
From: RETAIL STORE — 605
Re: Promotional material http://www.mystore.com/?XXXX — 606

| IP NUMBER 701 | DATE AND TIME 702 | URL 703 |
|---|---|---|
| 202.247.132.194 - - | [02/Jun/1999:16:13:02 -0700] | "GET/email/index.html?UTID=XXXX&UTPN=5678&UTSN=9876 HTTP/1.1" 200 3503 |
| 207.247.132.194 - - | [02/Jun/1999:16:13:02 -0700] | "GET/email/img/quick.GIF HTTP/1.1" 200 2411 |
| 207.247.132.194 - - | [02/Jun/1999:16:13:03 -0700] | "GET/email/img/go.gif HTTP/1.1" 200 240 |
| 207.247.132.194 - - | [02/Jun/1999:16:13:03 -0700] | "GET/email/img/order.GIF HTTP/1.1" 200 3364 |
| 207.247.132.194 - - | [02/Jun/1999:16:13:03 -0700] | "GET/email/img/line.GIF HTTP/1.1" 200 79 |
| 207.247.132.194 - - | [02/Jun/1999:16:13:04 -0700] | "GET/email/img/logo.GIF HTTP/1.1" 200 2628 |
| 207.247.132.194 - - | [02/Jun/1999:16:13:05 -0700] | "GET/email/img/products.GIF HTTP/1.1" 200 93286 |
| 207.247.132.194 - - | [02/Jun/1999:16:13:09 -0700] | "GET/email/bottom.htm HTTP/1.1" 200 910 |
| 207.247.132.194 - - | [02/Jun/1999:16:13:09 -0700] | "GET/email/img/bg.GIF HTTP/1.1" 200 99 |
| 207.247.132.194 - - | [02/Jun/1999:16:13:09 -0700] | "GET/email/img/email.GIF HTTP/1.1" 200 3227 |
| 207.247.132.194 - - | [02/Jun/1999:16:13:09 -0700] | "GET/email/img/link_wine.gif HTTP/1.1" 200 2260 |
| 207.247.132.194 - - | [02/Jun/1999:16:13:09 -0700] | "GET/email/img/link_computer.gif HTTP/1.1" 200 2159 |
| 207.247.132.194 - - | [02/Jun/1999:16:13:10 -0700] | "GET/email/img/link_sports.gif HTTP/1.1" 200 2084 |
| 207.247.132.194 - - | [02/Jun/1999:16:13:10 -0700] | "GET/email/img/link_fashion.gif HTTP/1.1" 200 2067 |
| 207.247.132.194 - - | [02/Jun/1999:16:13:10 -0700] | "GET/email/img/link_art.gif HTTP/1.1" 200 2082 |
| 207.247.132.194 - - | [02/Jun/1999:16:13:10 -0700] | "GET/email/img/link_furniture.gif HTTP/1.1" 200 2171 |
| 207.247.132.194 - - | [02/Jun/1999:16:13:10 -0700] | "GET/email/img/links.gif HTTP/1.1" 200 674 |
| 207.247.132.194 - - | [02/Jun/1999:16:13:10 -0700] | "GET/email/img/h_computers.GIF HTTP/1.1" 200 7555 |
| 207.247.132.194 - - | [02/Jun/1999:16:13:13 -0700] | "GET /email/EmblazeVideoPro/computerv_toshiba_notbook.htm HTTP/1.1" 200 1971 |
| 207.247.132.194 - - | [02/Jun/1999:16:13:14 -0700] | "GET/email/img/movieframe.gif HTTP/1.1" 200 482 |

| IP NUMBER | QTY | COST | DATE AND TIME PROD DESCR | CREDIT CARD NUMBER | TYPE | PROD # |
|---|---|---|---|---|---|---|
| 202.247.132.194 | 2 | 159.89 | [02/Jun/1999:16:13:02 -0700] 3COM 28K MODEM | 0025-5232-8545-6325 | VISA | P0521 |
| 207.247.132.194 | 1 | 649.99 | [02/Jun/1999:16:13:02 -0700] XEROX LASER PRINTER | 0025-5232-8545-6325 | VISA | KL852 |
| 207.247.132.194 | 5 | 29.99 | [02/Jun/1999:16:18:02 -0700] 10 - PK CD - RW | 0025-5232-8545-6325 | VISA | JK234 |
| 102.437.242.224 | 1 | 599.99 | [02/Jun/1999:16:18:04 -0700] HP LASERJET IIS | 8514-9856-8745-9652 | MC | PK212 |
| 102.437.242.224 | 1 | 15.23 | [02/Jun/1999:16:18:04 -0700] COLOR INK CARTRIDGE | 8514-9856-8745-9652 | MC | UJ989 |

ELECTRONICALLY DISTRIBUTING PROMOTIONAL AND ADVERTISING MATERIAL BASED UPON CONSUMER INTERNET USAGE

FIELD OF THE INVENTION

This invention relates to electronic commerce and more particularly, to a method for sending promotional material based upon consumer movement within a web site.

BACKGROUND

The Internet connects thousands of computers world wide through well known protocols, for example, Transmission Control Protocol (TCP)/Internet Protocol (IP), into a vast network. A computer needs a unique Internet Protocol (IP) address to communicate once connected to the Internet. Information on the Internet is stored world wide as computer files, mostly written in the Hypertext Mark Up Language ("HTML"). The collection of all such publicly available computer files is known as the World Wide Web (WWW).

The WWW is a multimedia-enabled hypertext system used for navigating the Internet and is made up of hundreds of thousands of web pages with images, text and video files, which can be displayed on a computer monitor. Each web page can have connections to other pages, which may be located on any computer connected to the Internet.

The WWW is based on the concept of hypertext, where connections from parts of text to other documents can be hidden behind words and phrases. The connections to hypertexts are referred to as hypertext links and they allow users to read documents in any order desired.

The WWW also uses hypermedia that connects links to pictures, sounds and any other data files, which can be stored on a computer. Conventionally, hypermedia connects data files regardless of their format.

A typical Internet user uses a client program called a "Web Browser" to connect to the Internet. A user can connect to the Internet via a proprietary network, such as America Online or CompuServe, or via an Internet Service Provider, e.g., Earthlink.

A Web Browser may run on any computer connected to the Internet. Currently various browsers are available of which two prominent browsers are Netscape Navigator and Microsoft Internet Explorer.

The Web Browser receives and sends requests to a web server and acquires information from the WWW. A web server is a program that, upon receipt of a request, sends the requested document to the requesting user.

A standard naming convention known as Uniform Resource Locator ("URL") has been adopted to represent hypermedia links and links to network services. Most files or service can be represented with a URL. URLs enable Web Browsers to go directly to any file held on any WWW server. A URL typically consists of three parts: the transfer format (the protocol type), the host name of the machine which holds the file (WWW server name) and the path name to the file.

Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

The Internet is also integrated with television, smart phones and other electronic devices, making electronic commerce a viable option for thousands of consumers and businesses alike. In a typical electronic commerce transaction, a consumer visits the web site of a seller, views an electronic image of a product or witnesses a product demonstration via a video/audio stream and may purchase a product or services by using a credit or debit card.

With the increasing popularity of the Internet, electronic mail ("email") has become a popular way to communicate. Email allows users to send text, pictures, video and audio recordings to a recipient or to a group of recipients.

Typically, a user will create an email message using an email program running on a computer that is or can be connected to a network of computers. The email message can include text, recorded and live video, audio files, image files and embedded web site links. Email messages also include sender's email address. A user electronically transmits email messages to a recipient or a group of recipients. The recipient(s) can read and reply to email messages using an email program running on a computer.

The Internet is commonly used to send and receive email messages from anywhere in the world. Every user has a unique email address. The general form of an email address is given as: User@Domain.com. Domain is defined as the domain name service ("DNS") that implements the protocol used for email transfer. The protocol used for electronic mail on the Internet is called the Simple Mail Transfer Protocol ("SMTP"), where a user invokes SMTP to send an email.

Retailers and business entities today can conduct large-scale business in the electronic commerce environment and communicate with thousands of consumers via email messages. Advertising materials to consumers can also be sent via email messages that can contain text, images, video clips and web site addresses.

Currently, consumers receive electronic advertising material either as a part of a mass email transmission ("email blast"), or when a consumer provides an individual profile. Both the foregoing options have limitations. Mass email blasts may not consider what an individual consumer desires or prefers. Furthermore, getting consumers to provide individual profiles is difficult because consumers may not willingly provide personal information.

Hence, what is needed is a method and system that efficiently and intelligently transmits advertising/promotional material by tracking individual user preferences.

SUMMARY

The present invention addresses the foregoing by providing a method for electronically sending promotional material based upon consumer preferences. A unique identifier is assigned to a consumer electronic mail address and an electronic mail is sent to the consumer, wherein the electronic mail includes a plurality of embedded Internet web sites. Thereafter, the consumer accesses the plurality of embedded Internet web sites, and consumer user movement within the plurality of the accessed embedded Internet web sites is tracked.

Consumer movement within the web site is stored in a log file and the log file data is used to generate a master database, wherein the master database comprises of a plurality of segments including an electronic look up segment, consumer information segment, promotional material segment, URL segment, credit card segment and purchase information segment. The master database is queried to obtain user tastes and preferences. Based upon the query results, promotional material is sent to the consumer.

In another aspect of the invention, consumer credit card information is acquired and consumer's movement within a web site is tracked by storing consumer's IP address corresponding to consumer's credit card information in a log file. Data stored in the log file is used to generate a master database, wherein the master database comprises of a plurality of segments including an electronic look up segment, consumer information segment, promotional material segment, URL segment, credit card segment and purchase information segment. The master database is queried to obtain user tastes and preferences. Based upon the query results, promotional material is sent to the consumer.

The present invention has the advantage over existing systems because it allows sellers to target potential customers effectively by using intelligent information regarding consumer tastes and preferences, obtained efficiently by analyzing consumer movement within a web site.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
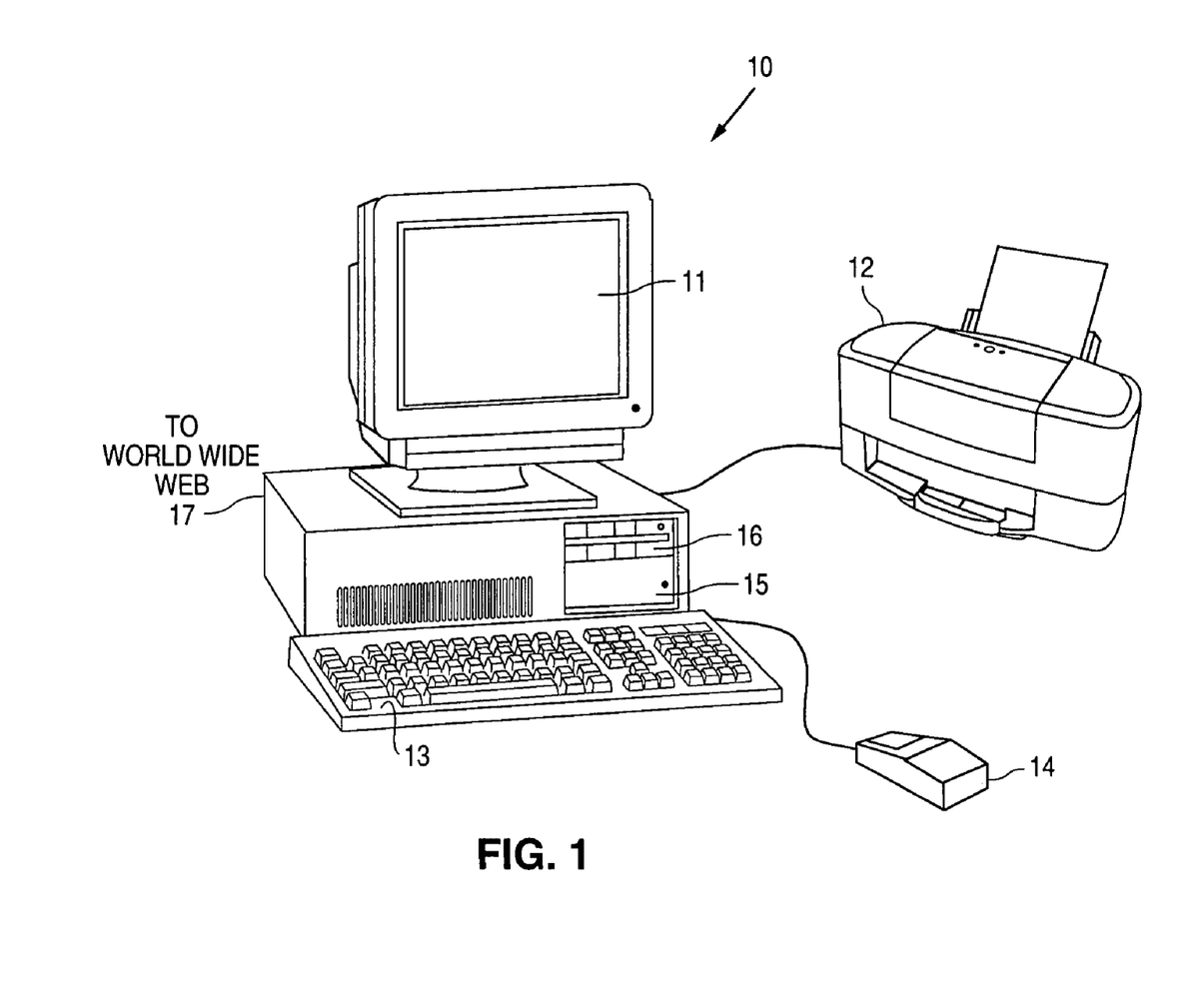
FIG. 1 is block diagram of a computing system with a computer connected to the Internet to carry out the inventive technique.

FIG. 1 is a block diagram of a computing system for executing computer executable process steps according to the present invention, which includes a host computer 10, a monitor 11, and a printer 12. Monitor 11 may be a CRT type, a LCD type, or any other type of color or monochrome display. Printer 12 may be any type of printer such as an inkjet printer, laser printer, thermal printer, dot matrix, or the like for printing Internet documents. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 stores email programs, log files for tracking user movement within a web site, application programs including web browsers by which computer 10 connects to the Internet, accesses web pages, stores files on disk 15, displays data in those web pages on monitor 11, and print data on printer 12.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files and data files stored on a CD-ROM.

A modem, an integrated services digital network (ISDN) connection, or the like also provides computer 10 with an Internet connection 17 to the World Wide Web (WWW). The Internet connection 17 allows computer 10 to download device drivers, data files, image files, log files, application program files and computer-executable process steps embodying the present invention.

Figure 2:
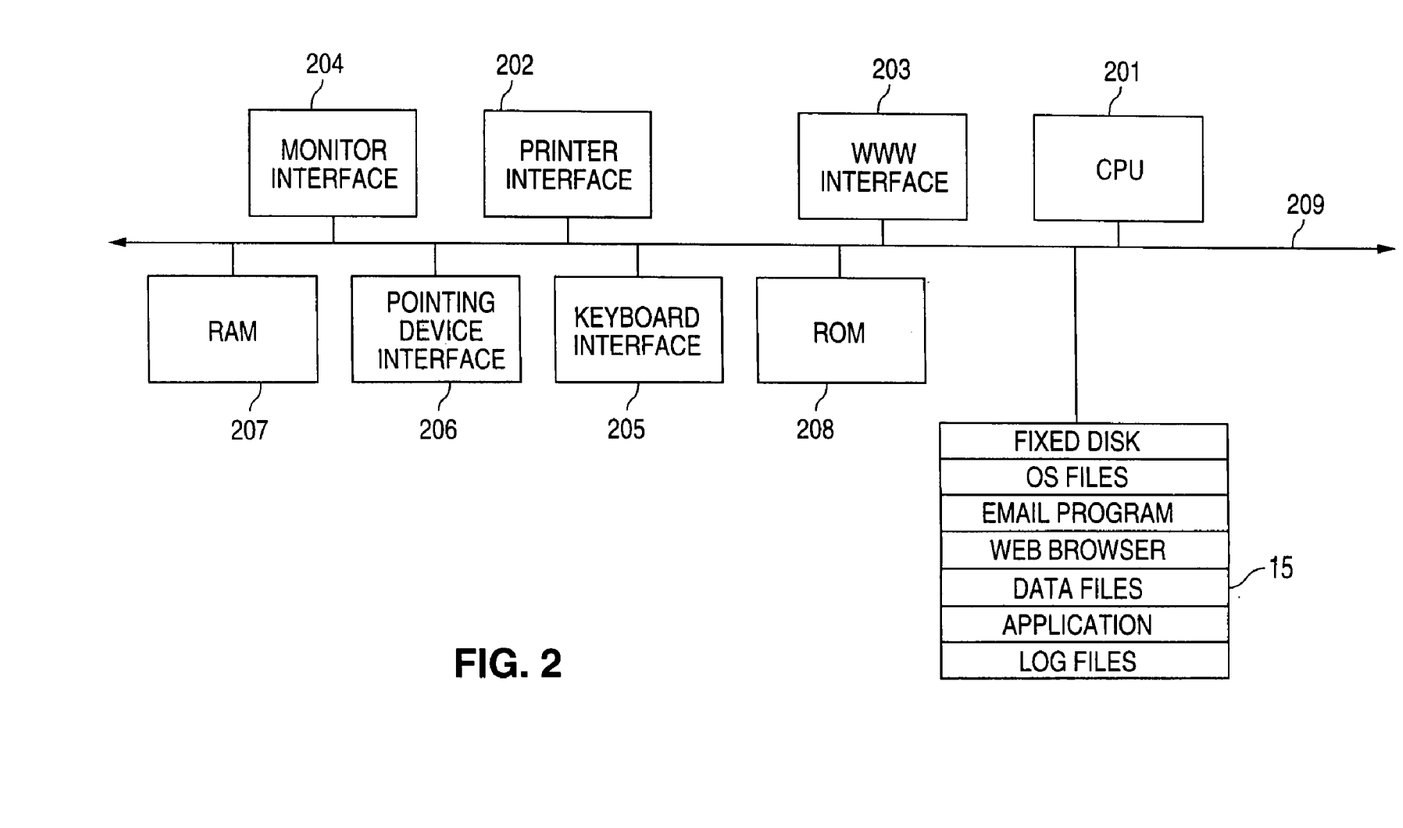
FIG. 2 is a block diagram of the architecture of the computing system of FIG. 1.

FIG. 2 is a block diagram showing the internal functional architecture of computer 10. As shown in FIG. 2, computer 10 includes a CPU 201 for executing computer-executable process steps and interfaces with a computer bus 209. Also shown in FIG. 2 are a printer interface 202, a WWW interface 203, a display device interface 204, a keyboard interface 205, a pointing device interface 206 and disk 15.

As described above, disk 15 stores operating system program files, application program files, web browsers, log files and device drivers. Some of these files are stored on disk 15 using an installation program. For example, CPU 201 executes computer-executable process steps of an installation program so that CPU 201 can properly execute the application program.

A random access main memory ("RAM") 207 also interfaces to computer bus 209 to provide CPU 201 with access to memory storage. When executing stored computer-executable process steps from disk 15 (or other storage media such as floppy disk 16 or WWW connection 17), CPU 201 stores and executes the process steps out of RAM 207.

Read only memory ("ROM") 208 is provided to store invariant instruction sequences such as start-up instruction sequences or basic input/output operating system (BIOS) sequences for operation of keyboard 13.

Figure 3:
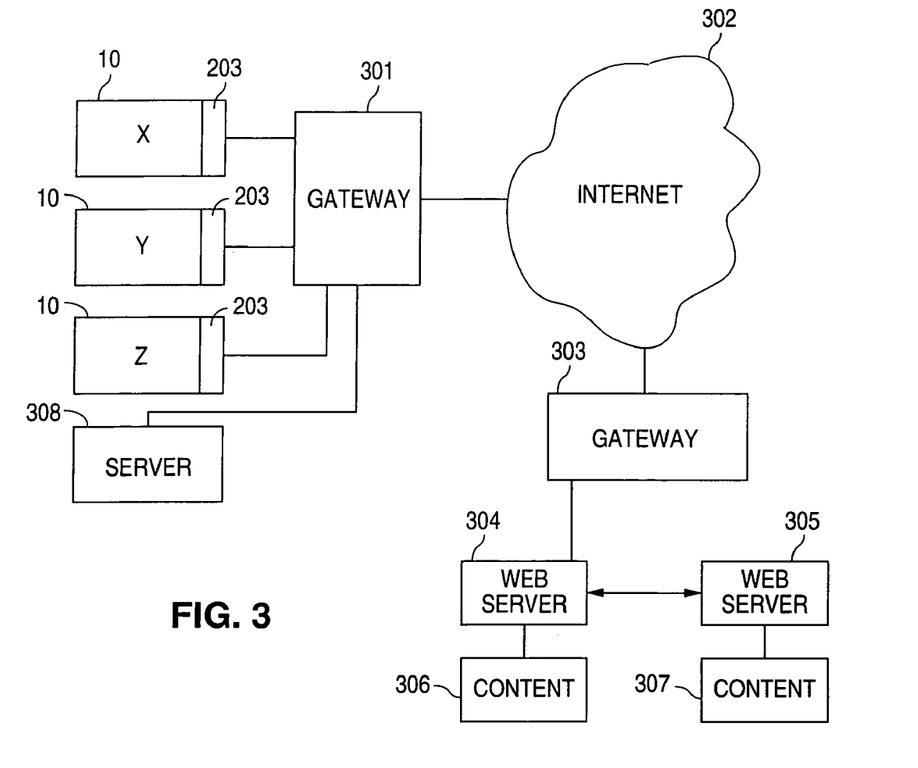
FIG. 3 is a block diagram showing a network topology to carry out the inventive technique.

FIG. 3 shows a topology of a computer network with computers similar to computer 10, connected to the Internet. For illustration purposes, only three computers X, Y and Z are shown connected to the Internet 302 via Web Interface 203 through a gateway 301, where gateway 301 can interface N number of computers. Web interface 203 may be a modem, network interface card or a unit for providing connectivity to other computer systems over a network using protocols such as X.25, Ethernet or TCP/IP, or any device that allows directly or indirectly, computer-to-computer communications.

It is noteworthy that the invention is not limited to a particular number of computers. Any number of computers that can be connected to the Internet 302 or a network may be used.

FIG. 3 further shows a second gateway 303 that connects a network of web servers 304 and 305 to the Internet 302. Web servers 304 and 305 may be connected with each other over a computer network. Web servers 304 and 305 can provide content to a user from database 306 and 307. Also shown in FIG. 3 is a client side web server 308 that can be provided by an Internet service provider.

Figure 4:
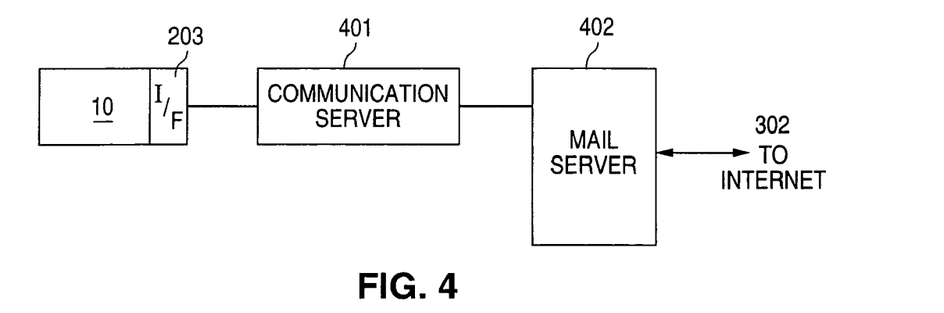
FIG. 4 is a topology of a network for electronic mail transfer.

FIG. 4 shows the topology of a network that allows sending emails to consumers using computer 10, or a similar computer that can be connected to a network and/or the Internet. In FIG. 4, computer 10 is connected to a mail server 402 via a communication server 401. Mail server 402 is connected to other computer networks including the Internet 302. Mail server 402 receives email messages with advertising and promotional materials and causes email messages to be sent to consumers with an email address.

Figure 5:
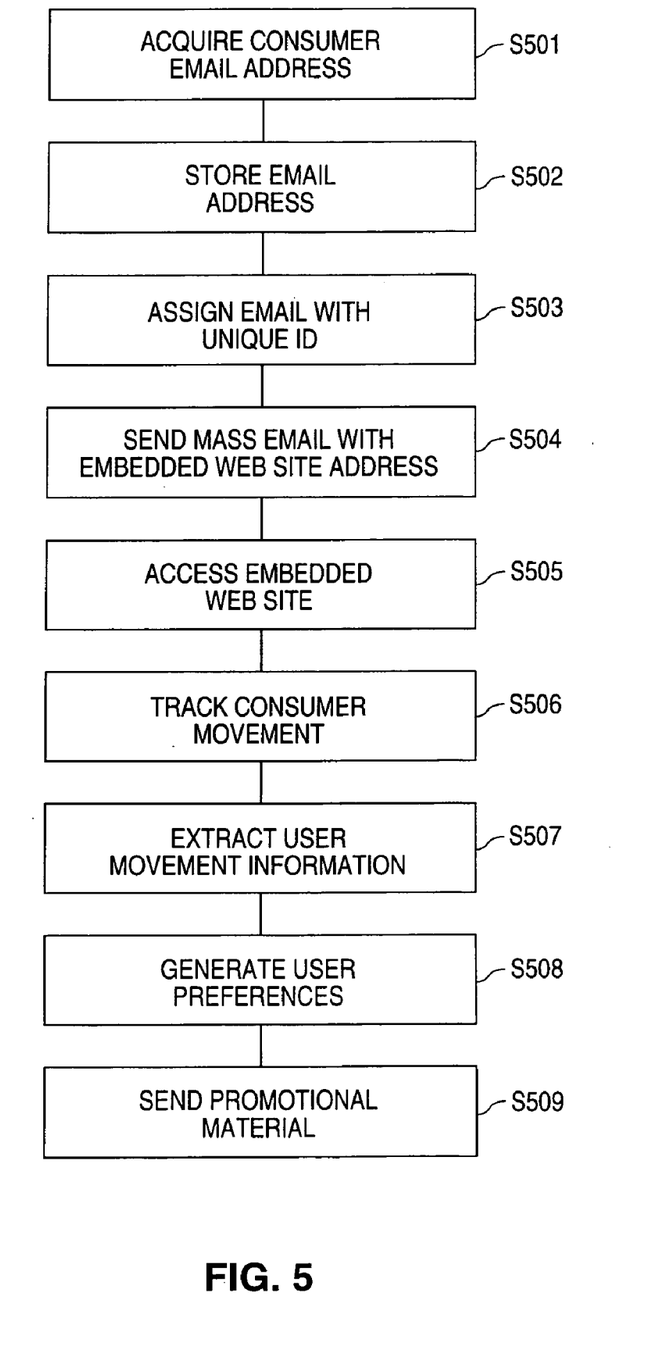
FIG. 5 is a basic flow chart showing computer executable process steps for sending promotional material to consumers.

Tracking Consumer Movement Within a Website:

FIG. 5 is a flow diagram showing computer executable process steps according to the present invention for tracking consumer movement within a web site. Generally, the FIG. 5 process steps include acquiring a plurality of consumer email addresses, applying a unique identifier to each acquired email address, sending emails with a web site address to a consumer having a unique email identifier, initiating a web site by the consumer in response to the sent email, tracking consumer movement within the website, creating a consumer profile based upon the consumer's movement within the web site, and sending promotional material based upon the consumer's profile.

More particularly, flow begins at step S501, in which a consumer's email address is acquired. The email address may be acquired at a retail store where a customer purchases merchandise ("Point of Sale"). Furthermore, email addresses may be solicited from Internet users visiting a particular web site, acquired from other businesses and databases etc.

In step S502, the acquired email address is stored in a computer system similar to computer 10 connected to the Internet 302.

Figure 6A:
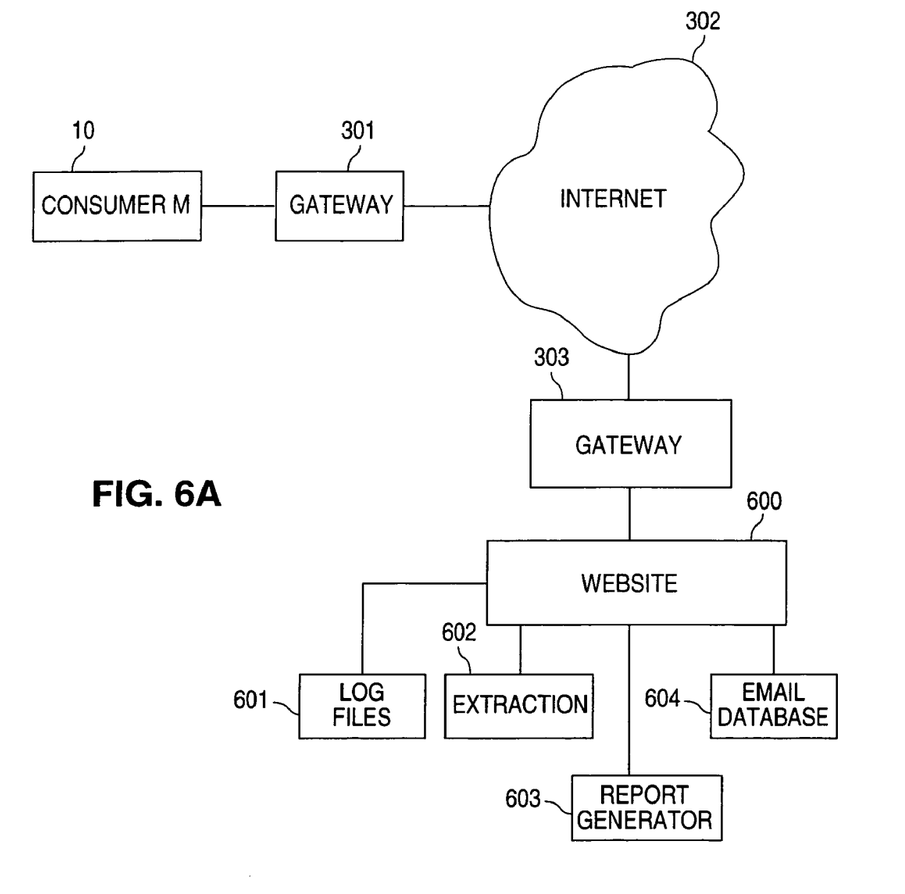
FIG. 6A is a topology of a network to implement process steps of FIG. 5.

FIG. 6A shows a topology of a computer network to implement process steps of FIG. 5. FIG. 6A shows a computer 600 similar to computer 10, and connected to the Internet and having a seller's web site. Also shown in FIG. 6A is a log file 601, an email database 604 that stores emails acquired in step S501, an extraction program 602 and a report generating module 603 stored on computer 600 or at different computers connected to the Internet. The foregoing file, database, program and modules can be interlinked as separate modules located at different computers connected to the Internet, or can be combined into one single program. FIG. 6A further shows a Consumer M with computer 10 or a computer similar to computer 10 connected to the Internet 302.

In step S503, the acquired email address is provided with a unique identifier. The unique identifier can be information related to the consumer, or a random alphanumeric character. The unique identifier does not affect the consumer's ability to receive and send email.

Figure 6B:
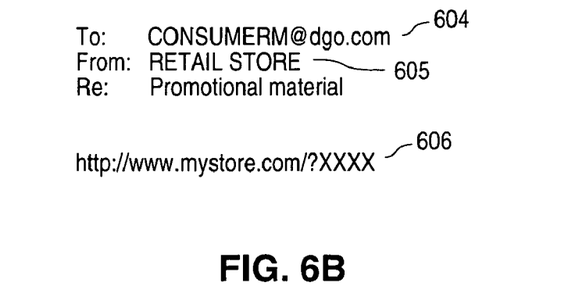
FIG. 6B is an example of an electronic mail sent to a consumer according to one aspect of the present inventive technique.

In step S504, an email blast with the seller's web site address is sent to consumers whose email addresses have a unique identifier. FIG. 6B shows an example of an email 604A sent to Consumer M with the email address ConsumerM@dgo.com. The email has an embedded URL 606, http://www.mystore.com/?XXXX sent by Retail Store 605. The web page associated with URL 606 can include links to other web pages located on different web servers. In the example of FIG. 6B, "XXXX" after the "?" is the unique identifier assigned to the email address of consumer M. It is noteworthy that the unique identifier is not limited to any particular set of alphanumeric characters.

In step S505, Consumer M accesses the web site corresponding to URL 606 either by clicking on URL 606 by pointing device 14, or by typing the URL 606 address by keyboard 13.

Figure 6C:
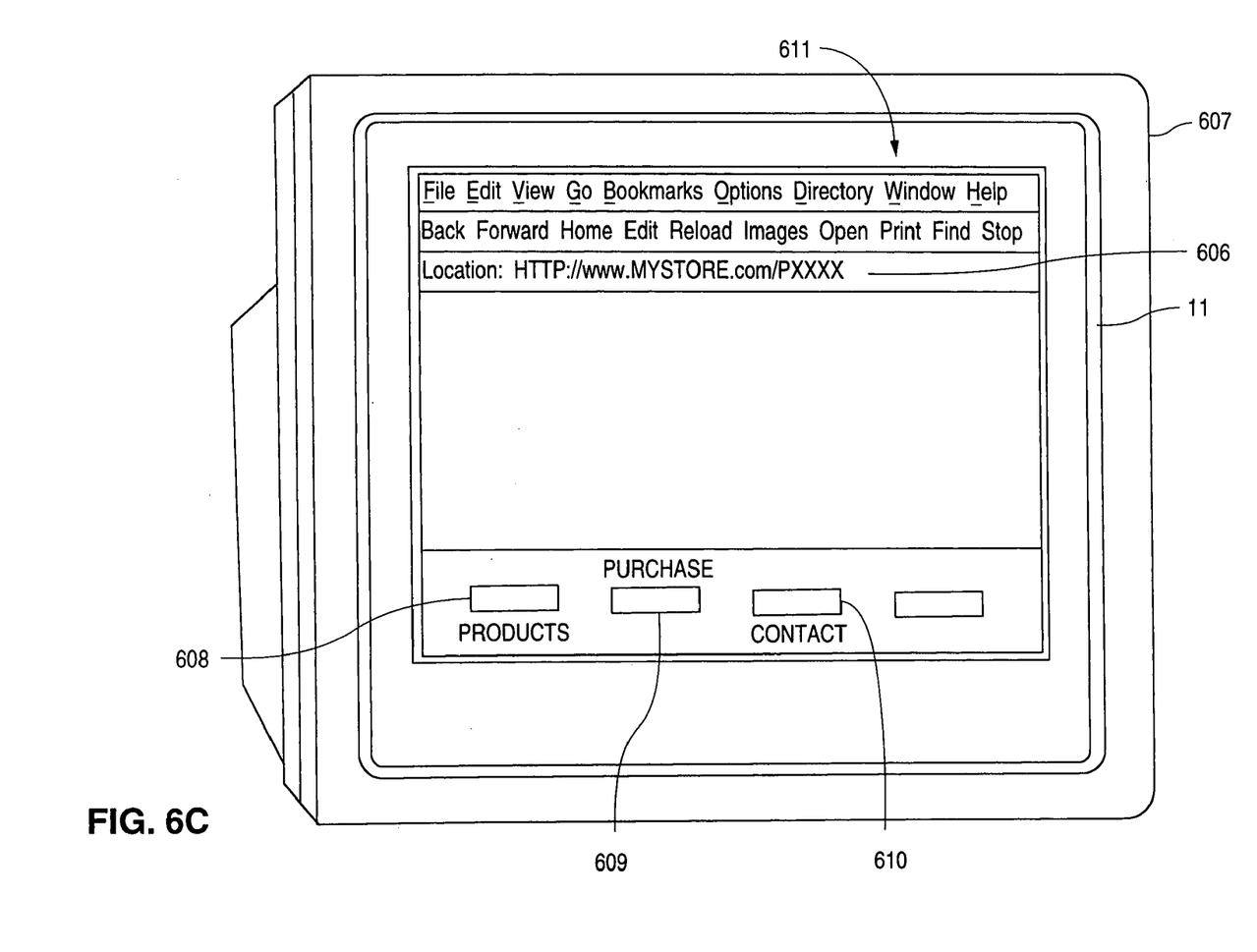
FIG. 6C shows an example of a seller's web site.

FIG. 6C shows a typical website 611 displayed on monitor screen 11, in a web browser 607 on Consumer M's computer similar to computer 10. FIG. 6C also shows various modules in web site 611, for example a products module 608 that allows Consumer M to view products or provide information regarding products, purchasing module 609 that allows Consumer M to purchase any products on-line and a contact module 610 that allows Consumer M to contact the retail store. Other modules can be added to web site 611. The foregoing modules can be located on different computers connected to the Internet.

Typically, when a consumer browses a web site, the web server automatically logs connection or environment specific information (e.g., IP address, operating system type, etc.) in association with information that defines the consumer's browsing activities. In step S506, web server 600 logs the URL address with a unique identifier and a corresponding IP address for Consumer M's computer, tracks Consumer M's movement within web site 611 and stores all the data associated with Consumer M's IP address in a log file. Consumer M's movement is tracked by first identifying the IP address with a unique identifier, and thereafter, the IP address is tracked when Consumer M visits the various links within web site 611.

Figure 7A:
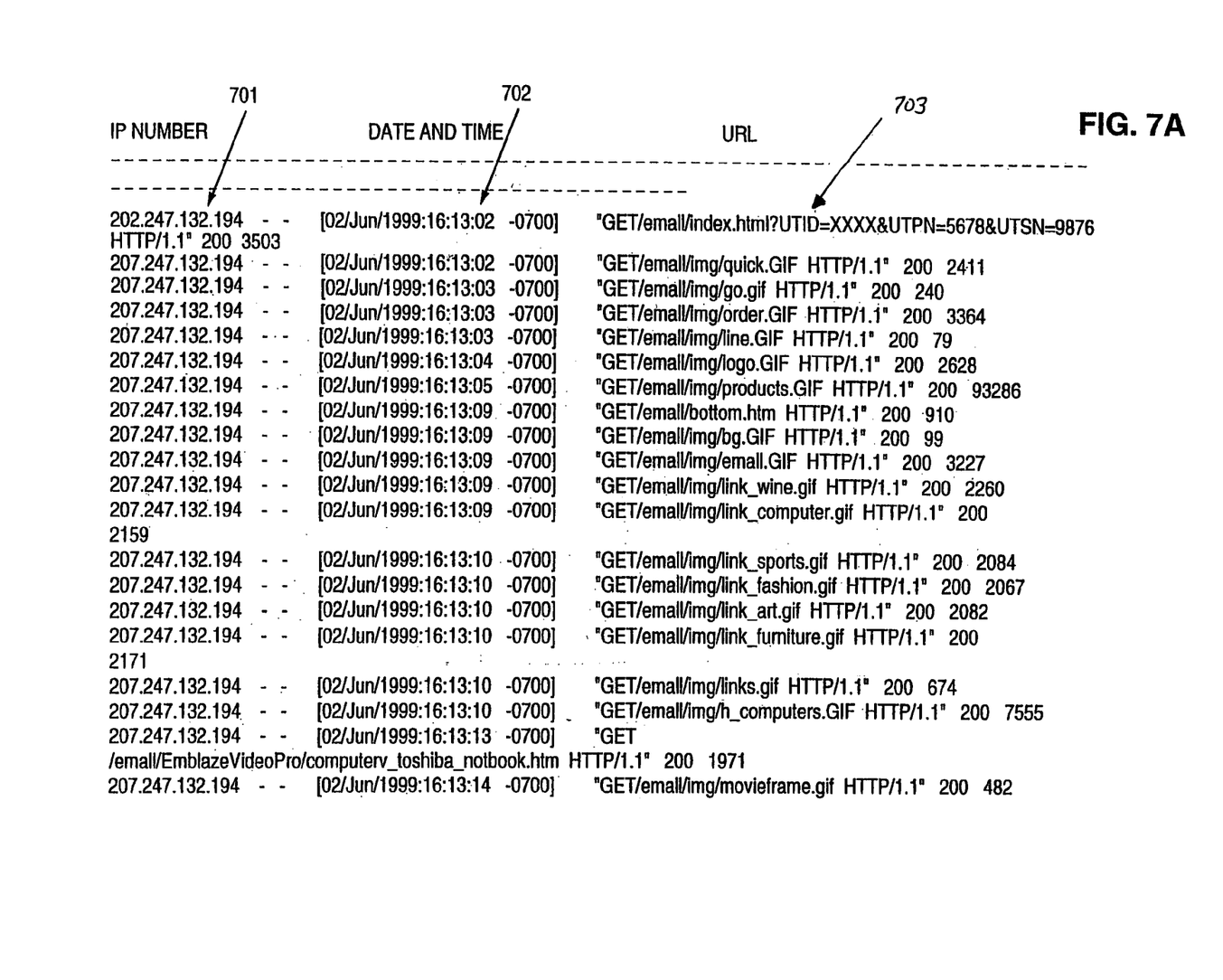
FIG. 7A is an example of a log file generated to track consumer movement within a web site with a unique identifier tagged to consumer email address, according to one aspect of the present inventive technique.

FIG. 7A shows an example of a log file 700 with an IP address 701 associated with information that defines consumer activity such as, an email unique identifier 703 and the date and time of Consumer M's visit 702 to the web site that provides the duration of the visit. Information logged can include all the web page addresses of the web sites that Consumer M visits, wherein the web sites include web pages located on a plurality of web servers, duration of the visits, and product purchased.

In step S507, extraction module 602 extracts information corresponding to the IP address 701 with a unique identifier 703. Information from the log file 700 can be extracted in real time while Consumer M is on-line or at any predetermined time interval.

Figure 8:
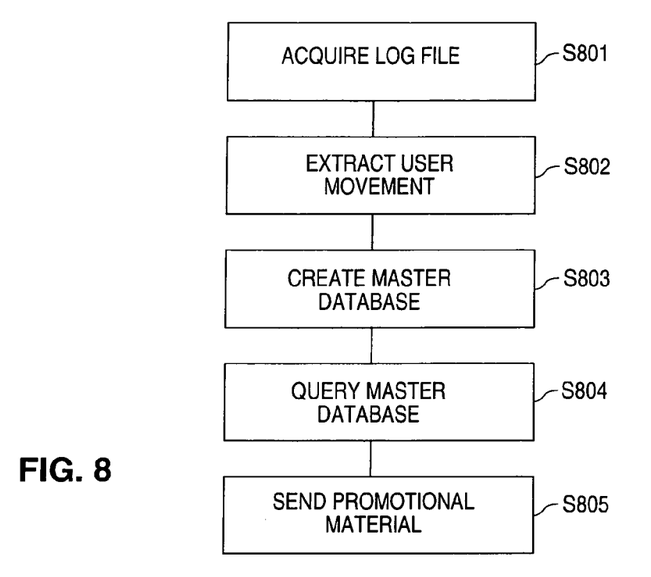
FIG. 8 is a detailed flow diagram showing computer executable process steps to create a master database according to one aspect of the present invention.

In step S508, report-generating module 603 generates a report based upon Consumer M's movement within website 611. Factors considered in creating the report include the type of modules visited, e.g., whether the user visited the clothing module, wine module or other product modules, duration of the visit and if the user purchased any item during the visit. FIG. 8 below describes detail process steps to create a master database for generating such a report.

In step S509, a second email is sent to Consumer M based upon Consumer M's tastes and preferences determined by analyzing Consumer M's movement within web site 611.

Creating a Master Database Based Upon a Consumer's Movement Within a Web Site:

FIG. 8 describes process steps to create a master database based upon consumer movement within a web site. The master database provides information regarding consumer choices and preferences.

In step S801, extraction module 602 acquires log file 601.

In step S802, extraction module 602 extract's consumer movement information within a web site tracked by a consumer's unique identification number and recorded in log file 601.

In step S803, a master database is created based upon the extracted information.

Figure 9:
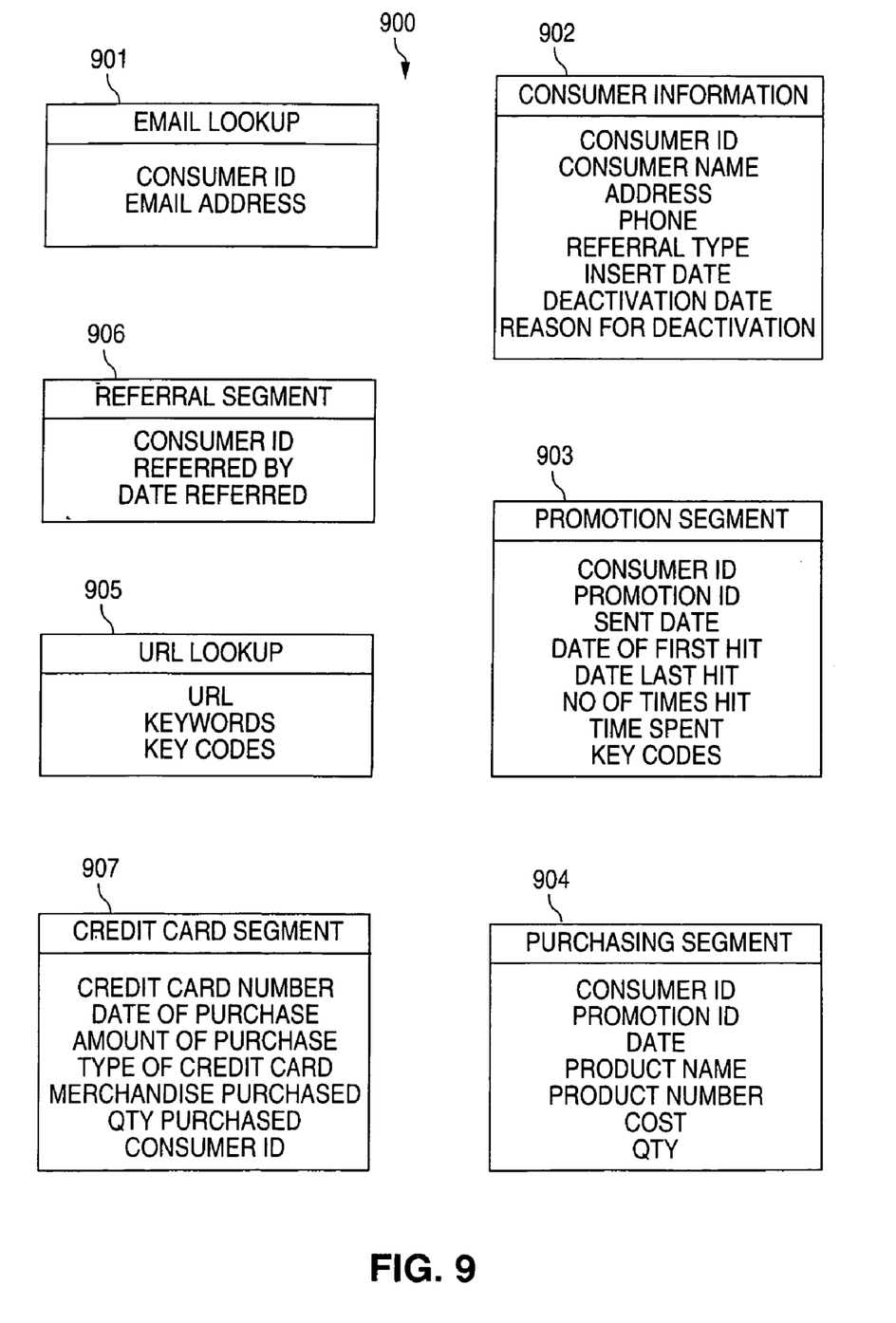
FIG. 9 is an example of a master database according to one aspect of the present invention.

FIG. 9 shows a typical database 900 that can be created from the extracted consumer information.

FIG. 9 shows an email look up segment 901 that has email addresses and corresponding unique identification numbers for all consumers with tagged email addresses. A user information segment 902 includes details regarding consumer background including consumer identification number, telephone number, address, referral type, date the record was created, date consumer identification was deactivated and reason for deactivation and key codes corresponding to keywords associated with web sites that the consumer has visited.

FIG. 9 also shows a promotion segment 903 that includes information regarding promotional material sent to consumers. The promotion segment 903 includes consumer identification number, promotion identification number, date a particular promotion was sent, date the promotion was visited by the consumer, amount of time spent at the web site while visiting the promotion and any specific areas the consumer visited and key codes associated with key words corresponding to defined URLs.

FIG. 9 further shows a purchasing segment 904 that provides transaction details when a consumer purchases products while at a web site that may be located at any web server. Purchasing module 904 includes information regarding consumer identification number, a promotion identification number, date of purchase, product name, product type, product identification code, cost and quantity purchased.

Also shown in FIG. 9 are a URL segment 905, a referral segment 906 and a credit card segment 907. URL segment 905 includes URL addresses, keywords corresponding to URL addresses and key codes associated with the keywords.

Figure 10:
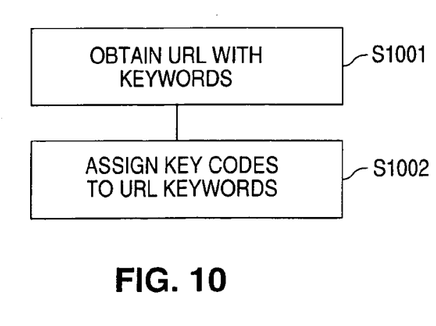
FIG. 10 is a flow diagram showing computer executable process steps to create a URL segment of the master database.

FIG. 10 describes process steps for developing URL segment 905. Step S1001 obtains URL addresses with corresponding keywords. There are various ways to obtain URL addresses with keywords. For example, a seller could provide a list of URLs with associated keywords, or web sites associated with particular URLs can be manually visited and analyzed for determining keywords, or an automatic Internet crawler mechanism may be used to automatically obtain web sites associated with particular URL's and then analyzed for keywords.

In step S1002, assign unique key codes to keywords obtained in step S1001. For example, a single numeric key code can be assigned to a group of keywords in the website with a URL address. The key code assigned in URL segment 905, as shown in FIG. 9 is also a data field in promotion segment 903.

Referral segment 906 includes information regarding consumer identification numbers, referral source identification information and the dates the consumers are referred.

Figure 11:
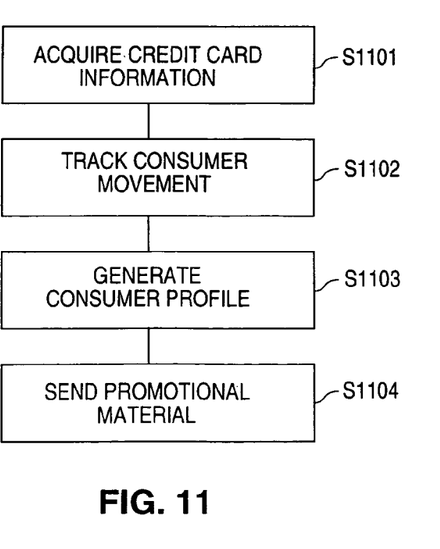
FIG. 11 is a flow diagram showing computer executable process steps for sending promotional material based upon consumer credit card information.

Credit card segment 907 includes information regarding credit card type, date of purchase, amount spent and merchandise or services bought. FIG. 11 describes in detail how Credit Card segment 907 is populated and utilized according to the present invention.

In step S804, master database 900 is queried to generate a user profile for sending promotional material. Various query options can be used to gather consumer information. For example, information regarding consumers that have purchased a product may be obtained from purchasing module 904. Information regarding consumers that have spent a minimum amount of time at the web site can be obtained from promotion segment 903. Keyword search can be performed by using key codes after acquiring key codes from URL segment 905 and then conducting a search in promotion segment 903. Hence master database 900 may be queried in different ways to obtain information regarding consumer taste, habit and preferences. Master database 900 can also be used to deactivate consumers who do not respond to any promotional materials or do not purchase any items, or have an invalid email address or if removal is requested by the consumer.

In step S805, promotional material is sent to consumers based upon consumer preferences obtained after querying master database 900.

Credit Card Segment:

FIG. 11 shows computer executable process steps for tracking consumer movement within a seller's web site based upon user credit card information.

In step S1101, acquire consumer credit card information including consumer name and address. This information may be acquired when a consumer visits a seller's web site and purchases any item including merchandise or services. The consumer provides a credit card number, consumer name and consumer address. If the consumer provides an email address, then process steps of FIG. 5 can be applied to send promotional materials.

Figure 7B:
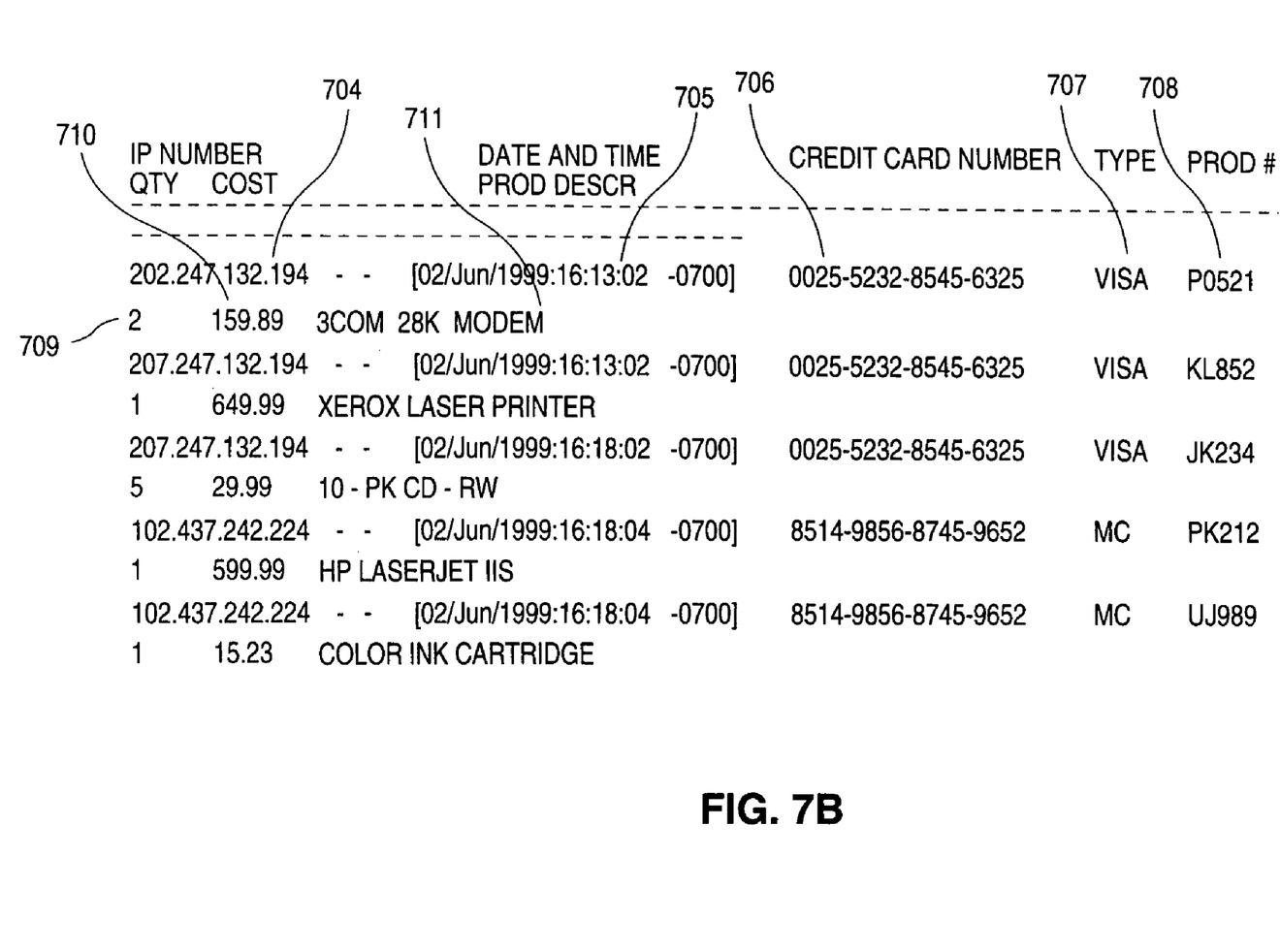
FIG. 7B is an example of a log file generated to track consumer movement within a web site using credit card information according to one aspect of the present inventive technique.

In step S1102, track consumer movement after consumer has purchased an item from seller's website with a credit card. Consumer's movement is tracked by tracking consumer's IP address linked to Consumer's credit card information, and storing consumer movement in a log file similar to the log file shown in FIG. 7B. The log file shown in FIG. 7B includes consumer's IP address 704, date and time of consumer visit 705, credit card number 706, credit card type 707, product number 708, quantity purchased 709, cost 710 and product description 711.

In step S1103, generate consumer profile using credit card segment 907, similar to process step S508 of FIG. 5 and step 804 of FIG. 8.

In step S1104, send promotional material to consumer. Promotional material may be send electronically if email address was acquired in step S1101 or via regular mail since the street address was acquired in step S1101.

Although the present invention has been described with reference to specific embodiments, these embodiments are illustrative only and not limiting. Many other applications and embodiments of the present invention will be apparent in light of this disclosure and the following claims.

What is claimed is:

1. A method for electronically identifying a consumer without requiring consumer registration, the method comprising:

embedding a unique identifier within a web site address, the unique identifier uniquely identifying an email recipient;

including the web site address in an electronic mail message sent to the email recipient, wherein the web site address provides the email recipient with access to one or more web sites;

establishing a connection between a client computer used by the email recipient to receive the email and a server computer providing access to the one or more web sites, in response to the email recipient selecting a reference to the web site address included in the electronic mail message;

providing the unique identifier to the server computer by way of sending the web site address to the server computer in a request submitted by the client computer to access said one or more web sites, independent from any consumer profile information previously stored on the client computer;

parsing the web site address in the request, to retrieve the unique identifier embedded in the web site address;

identifying the email recipient based on the retrieved unique identifier; and tracking the email recipient's movement within the one or more web sites by associating the unique identifier with information that defines consumer activity within said one or more web sites.

2. The method of claim 1, wherein the act of tracking the email recipient's movement within said one or more web sites comprises:

storing in at least one log file the unique identifier in association with the information that defines consumer activity; and extracting the information that defines consumer activity based on said association to track consumer movement.

3. The method of claim 1, wherein the act of associating the unique identifier with information that defines consumer activity comprises:

identifying an IP address of the client computer, wherein the IP address is automatically logged in correspondence with the information that defines consumer activity; and associating the unique identifier with the IP address such that the information that defines consumer activity can be extracted based on the association between the IP address and the unique identifier.

4. The method of claim 1, wherein the act of associating the unique identifier with information that defines consumer activity comprises:

identifying connection specific information related to the established connection between the client computer and the one or more web sites, wherein the connection specific information is automatically logged in correspondence with the information that defines consumer activity; and associating the unique identifier with the connection specific information such that information that defines consumer activity can be extracted based on the association between the connection specific information and the unique identifier.

5. The method according to claim 1, wherein the unique identifier identifies a consumer's electronic mail address.

6. The method according to claim 1, wherein the one or more web sites include a plurality of links to other web pages located at a plurality of web servers.

7. The method according to claim 6, wherein the plurality of links to other web pages includes a link to a web page from where the consumer purchases merchandise.

8. The method according to claim 6, wherein the plurality of links to other web pages includes a link to a web page from where the consumer electronically views images of merchandise.

9. The method according to claim 6, wherein the plurality of links to other web pages includes a link to a web page from where the consumer electronically contacts a seller.

10. The method according to claim 1, wherein information about the consumer's movement within the one or more web sites is stored in a log file.

11. The method according to claim 10, wherein the log file includes the addresses of the one or more web sites.

12. The method of claim 10, wherein the log file includes information regarding number of times the consumer accesses a particular web site.

13. The method of claim 10, wherein the log file includes information regarding any purchase the consumer makes while visiting the one or more web site.

14. The method according to claim 10, wherein the log file includes duration of the consumer's visit to a particular web site.

15. The method according to claim 10, further comprising:

developing a consumer master database based upon the log file;

querying the master database; and determining consumer preferences.

16. The method according to claim 15, wherein the master database includes a plurality of segments including an email look up segment that includes a listing of a plurality of consumer electronic mail addresses with corresponding unique identifiers.

17. The method according to claim 15, wherein the master database includes a consumer information segment that contains consumer related information.

18. The method according to claim 15, wherein the master database includes a promotional material segment that includes information regarding promotional materials.

19. The method according to claim 15, wherein the master database includes a purchasing segment that includes information regarding purchases made by the consumers.

20. The method according to claim 15, wherein the master database includes a URL segment that includes a plurality of URLs with corresponding keywords and plurality of keycodes associated with the keywords.

21. The method according to claim 15, wherein the master database includes a credit card segment that includes consumer credit card number, date and amount of purchase by consumer.

22. Computer executable process stored in a computer readable medium for identifying a consumer without requiring consumer registration, the process comprising:

embedding a unique identifier within a web site address, the unique identifier uniquely identifying a consumer;

establishing a connection between the consumer's computer and a server computer providing access to one or more web sites, in response to a consumer selecting a reference to the web site address forwarded by way of electronic mail;

providing the unique identifier to the server computer by way of sending the website address to the server computer to access the one or more web sites, independent from any consumer profile information previously stored on the client computer;

parsing the web site address to retrieve the unique identifier embedded in the web site address; and tracking the consumer's movement within the one or more web sites by associating the unique identifier with information that defines consumer activity within said one or more web sites.

23. The computer executable process of claim 22, wherein the act of tracking consumer movement within said one or more web sites comprises:

storing in a log file the unique identifier in association with the information that defines consumer activity within said one or more web sites;

searching the log file for the unique identifier; and extracting the information that defines consumer activity based on its association with the unique identifier to track consumer movement.

24. The computer executable process of claim 22, wherein the act of associating the unique identifier with information that defines consumer activity comprises:

identifying an IP address used for establishing the connection between the consumer's computer and the one or more web sites, wherein the IP address is automatically logged in correspondence with the information that defines consumer activity; and associating the unique identifier with the IP address such that the information that defines consumer activity can be extracted based on the association between the IP address and the unique identifier.

25. The computer executable process of claim 22, wherein the act of associating the unique identifier with information that define consumer activity comprises:

identifying connection specific information related to the established connection between the consumer's computer and the one or more web sites, wherein the connection specific information is automatically logged in correspondence with the information that defines consumer activity; and associating the unique identifier with the connection specific information such that data that defines consumer activity can be extracted based on the association between the IP address and the unique identifier.

26. Computer executable process steps according to claim 22, wherein the unique identifier identifies a consumer's electronic mail address.

27. Computer executable process steps according to claim 22, wherein the one or more web sites include a plurality of links to other web pages located at a plurality of web servers.

28. Computer executable process steps according to claim 27, wherein the plurality of links to other web pages located at a plurality of web servers includes a link to a web page from where the consumer can purchase merchandise.

29. Computer executable process steps according to claim 27, wherein the plurality of links to other web pages includes a link to a web page from where the consumer can electronically view images of merchandise.

30. Computer executable process steps according to claim 27, wherein the plurality of links to other web pages includes a link to a web page from where the consumer may electronically contact a seller.

31. Computer executable process steps according to claim 22, wherein information about the consumer's movement within the one or more web sites is stored in a log file.

32. Computer executable process steps according to claim 31, wherein the log file includes the addresses of the one or more web sites.

33. Computer executable process steps according to claim 31, wherein the log file includes information regarding number of times the consumer accesses a particular web site.

34. Computer executable process steps according to claim 31, wherein the log file includes information regarding any purchase the consumer makes while visiting the one or more web site.

35. Computer executable process steps according to claim 31, wherein the log file includes the duration of the consumer's visit to a particular web site.

36. Computer executable process steps according to claim 31, further comprising:

developing a consumer master database based upon the log file;

querying the master database; and determining consumer preferences.

37. Computer executable process steps according to claim 36, wherein the master database includes a plurality of segments including an email look up segment that includes a listing of a plurality of consumer electronic mail addresses with corresponding unique identifiers.

38. Computer executable process steps according to claim 36, wherein the master database includes a consumer information segment that contains consumer related information.

39. Computer executable process steps according to claim 36, wherein the master database includes a promotional material segment that includes information regarding promotional materials.

40. Computer executable process steps according to claim 36, wherein the master database includes a purchasing segment that includes information regarding purchases made by the consumers.

41. Computer executable process steps according to claim 36, wherein the master database includes a URL segment for storing a plurality of keywords associated with a plurality of URLs, and a plurality of key codes associated with the plurality of keywords.

42. Computer executable process steps according to claim 36, wherein the master database includes a credit card segment that includes consumer credit card number, date and amount of purchase by consumer.

43. The method of claim 1, wherein the unique identifier is a consumer's credit card information.

44. The computer executable process of claim 22, wherein the unique identifier is a consumer's credit card information.

45. A method for electronically identifying a consumer without requiring consumer registration, the method comprising:

receiving a consumer request to access one or more web sites implemented on at least one server computer, wherein the consumer request is submitted by way of a client computer and the request includes a web site address, sent to the consumer in an electronic mail message, with a unique identifier embedded in the web site address for uniquely identifying the particular consumer;

parsing the web site address to find the unique identifier; and logging the unique identifier in one or more log files in association with information that defines consumer activity within said one or more web sites, independent from any consumer profile information previously stored on the client computer by any servers.

46. The method of claim 45, further comprising:

extracting the information that defines consumer activity based on its association with the unique identifier to track consumer movement.

47. The method of claim 45, wherein the consumer request is received through a connection established between the consumer's computer and the one or more web sites, the method further comprising:

identifying at least one of connection and environment specific information related to the established connection between the consumer's computer and the one or more web sites, wherein at least one of the connection and environment specific information is automatically logged in correspondence with the information that defines consumer activity; and associating the unique identifier with at least one of the connection and environment specific information such that information that defines consumer activity can be extracted based on the association between at least one of the connection and environment specific information and the unique identifier.

48. The method of claim 47, wherein at least one of the connection and environment specific information relates to IP address of the consumer's computer.

49. The method of claim 47, wherein the unique identifier relates to credit card information of the consumer.

50. The method of claim 47, wherein the unique identifier relates to electronic mail address of the consumer.

51. The method of claim 47, wherein at least one of the connection and environment specific information relates to an operating system executing on the consumer's computer.

52. A unique identifier embedded in a URL provided to a consumer by way electronic mail, such that when the consumer selects the URL a connection is established between a consumer computer having a first IP address and a web server providing access to one or more web sites, wherein the web server receives the URL via said established connection independent from any consumer profile information previously stored on the client computer, wherein the web server parses the URL for the unique identifier, and wherein the IP address is recorded in a log file in association with the unique identifier.

53. A computer-implemented method for electronically tracking web pages visited by an email recipient without requiring advanced registration, the method comprising:

embedding a unique identifier within a uniform resource locator (URL), the unique identifier uniquely identifying an email recipient, the URL identifying one or more web pages;

including the URL in form of a link in an email sent to the email recipient, wherein selecting the link provides the email recipient with access to the one or more web pages;

establishing a connection between a server computer and a client computer used by the email recipient to receive the email, in response to the email recipient selecting the link, wherein the server computer provides access to the one or more web pages identified by the URL;

providing the unique identifier to the server computer by way of a request submitted by the client computer to access said one or more web pages, independent from any profile information previously stored on the client computer, wherein the request includes the URL in which the unique identifier is embedded;

parsing the URL in the request to retrieve the unique identifier embedded in the URL;

identifying the email recipient based on the retrieved unique identifier;

automatically storing the unique identifier in association with the IP address of the client computer in a log file of the server computer; and automatically storing access information about the one or more web pages visited by the email recipient in association with the IP address of the client computer in the log file of the server computer.

54. The computer-implemented method of claim 53, further comprising:

extracting the access information for a particular email recipient by cross-referencing the IP address of the client computer used by the particular email recipient with respective access information and unique identifier stored in the log file in association with the IP address.

55. The computer-implemented method of claim 53, wherein the access information comprises at least one of: an address of a web page visited by the email recipient, duration of the visit, and purchase information during of the visit.

56. A computer system for electronically tracking web pages visited by an email recipient without requiring advanced registration, the system comprising:

means for embedding a unique identifier within a uniform resource locator (URL), the unique identifier uniquely identifying an email recipient, the URL identifying one or more web pages;

means for including the URL in form of a link in an email sent to the email recipient, wherein selecting the link provides the email recipient with access to the one or more web pages;

means for establishing a connection between a server computer and a client computer used by the email recipient to receive the email, in response to the email recipient selecting the link, wherein the server computer provides access to the one or more web pages identified by the URL;

means for providing the unique identifier to the server computer by way of a request submitted by the client computer to access said one or more web pages, independent from any profile information previously stored on the client computer, wherein the request includes the URL in which the unique identifier is embedded;

means for parsing the URL in the request to retrieve the unique identifier embedded in the URL;

means for identifying the email recipient based on the retrieved unique identifier;

means for automatically storing the unique identifier in association with the IP address of the client computer in a log file of the server computer; and means for automatically storing access information about the one or more web pages visited by the email recipient in association with the IP address of the client computer in the log file of the server computer.

57. The computer system of claim 56, further comprising:

means for extracting the access information for a particular email recipient by cross-referencing the IP address Of the client computer used by the particular email recipient with respective access information and unique identifier stored in the log file in association with the IP address.

58. The computer system of claim 56, wherein the access information comprises at least one of: an address of a web page visited by the email recipient, duration of the visit, and purchase information during of the visit.

59. A computer-readable medium comprising a computer-executable process stored for electronically tracking web pages visited by an email recipient without requiring advanced registration, the computer-executable process comprising:

embedding a unique identifier within a uniform resource locator (URL), the unique identifier uniquely identifying an email recipient, the URL identifying one or more web pages;

including the URL in form of a link in an email sent to the email recipient, wherein selecting the link provides the email recipient with access to the one or more web pages;

establishing a connection between a server computer and a client computer used by the email recipient to receive the email, in response to the email recipient selecting the link, wherein the server computer provides access to the one or more web pages identified by the URL;

providing the unique identifier to the server computer by way of a request submitted by the client computer to access said one or more web pages, independent from any profile information previously stored on the client computer, wherein the request includes the URL in which the unique identifier is embedded;

parsing the URL in the request to retrieve the unique identifier embedded in the URL;

identifying the email recipient based on the retrieved unique identifier;

automatically storing the unique identifier in association with the IP address of the client computer in a log file of the server computer; and automatically storing access information about the one or more web pages visited by the email recipient in association with the IP address of the client computer in the log file of the server computer.

60. The computer-readable medium of claim 59, wherein the computer-executable process further comprises:

extracting the access information for a particular email recipient by cross-referencing the IP address of the client computer used by the particular email recipient with respective access information and unique identifier stored in the log file in association with the IP address, wherein the access information comprises at least one of: an address of a web page visited by the email recipient, duration of the visit, and purchase information during of the visit.

\* \* \* \* \*

UNITED STATES PATENT AND TRADEMARK OFFICE
CERTIFICATE OF CORRECTION

| | | |
|---|---|---|
| PATENT NO. | : 7,120,590 B1 | Page 1 of 1 |
| APPLICATION NO. | : 09/379167 | |
| DATED | : October 10, 2006 | |
| INVENTOR(S) | : Eisen et al. | |

It is certified that error appears in the above-identified patent and that said Letters Patent is hereby corrected as shown below:

Title Page # 73
The Assignee's name --User Trends, Inc.-- was incorrectly reported as "User Trencis, Inc." on the face sheet of the published patent.

Signed and Sealed this

Twenty-sixth Day of December, 2006

JON W. DUDAS
*Director of the United States Patent and Trademark Office*